United States Patent
Copeland et al.

(10) Patent No.: US 7,847,679 B2
(45) Date of Patent: Dec. 7, 2010

(54) MATERIAL WEAR INDICATION SYSTEM

(75) Inventors: Andrew D. Copeland, Greenwood, IN (US); Joel Rubel, Carmel, IN (US); Molly Harrison, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 517 days.

(21) Appl. No.: 11/977,963

(22) Filed: Oct. 26, 2007

(65) Prior Publication Data

US 2009/0107795 A1    Apr. 30, 2009

(51) Int. Cl.
 B60Q 1/00   (2006.01)
 F16D 66/02  (2006.01)
 F16D 23/00  (2006.01)
 F16D 25/12  (2006.01)
 F16D 27/14  (2006.01)

(52) U.S. Cl. .......... 340/454; 188/1.11 W; 188/1.11 L; 192/30 W

(58) Field of Classification Search ............. 340/453, 340/454; 190/30 W; 188/1.11 W, 1.11 I, 188/1.11 R
See application file for complete search history.

(56) References Cited

U.S. PATENT DOCUMENTS

| | | | |
|---|---|---|---|
| 3,271,737 A * | 9/1966 | Bezemek ............... | 340/454 |
| 3,560,919 A * | 2/1971 | Uribe .................. | 340/454 |
| 3,976,167 A * | 8/1976 | Hirai et al. ............ | 188/1.11 R |
| 4,049,084 A | 9/1977 | Beemer et al. | |
| 4,085,826 A | 4/1978 | Ritsema et al. | |
| 4,147,236 A | 4/1979 | Steffen et al. | |
| 4,174,024 A | 11/1979 | Hagiwara | |
| 4,201,974 A * | 5/1980 | Fima ................... | 340/454 |
| 4,266,633 A | 5/1981 | Barabino et al. | |
| 4,498,559 A | 2/1985 | Katagiri et al. | |
| 4,562,421 A * | 12/1985 | Duffy ................. | 340/454 |
| 4,567,972 A | 2/1986 | Buch et al. | |
| 4,604,604 A | 8/1986 | Mann | |
| 4,606,435 A | 8/1986 | Johnson | |
| 4,677,420 A | 6/1987 | Topic et al. | |
| 4,977,991 A | 12/1990 | Mahoney | |
| 5,020,650 A | 6/1991 | Heidenreich et al. | |
| 5,099,960 A | 3/1992 | Alev | |
| 5,139,114 A | 8/1992 | Rodriguez et al. | |
| 5,181,593 A | 1/1993 | Flotow et al. | |
| 5,238,093 A | 8/1993 | Campbell | |
| 5,261,508 A | 11/1993 | Kikuchi | |
| 5,285,190 A * | 2/1994 | Humphreys et al. ........ | 340/453 |
| 5,295,909 A | 3/1994 | Heidenreich | |

(Continued)

FOREIGN PATENT DOCUMENTS

JP    5690134 A    7/1981

*Primary Examiner*—Jennifer Mehmood
(74) *Attorney, Agent, or Firm*—Krieg DeVault LLP

(57) ABSTRACT

A material wear indication system is provided that includes a friction plate capable of engaging a moving surface and a wear indicator. The friction plate includes a wearable portion and a non-wearable portion. In one embodiment the wear indicator is embedded in the non-wearable portion and is prevented from contacting the moving surface until the wearable surface has been sufficiently eroded. When the wear indicator contacts the moving surface it emits a particulate matter that can be detected by a sensor. The sensor is operable to generate an electrical signal that is transmitted to a control unit when the wearable surface has eroded thereby exposing the wear indicator to the moving surface.

19 Claims, 4 Drawing Sheets

U.S. PATENT DOCUMENTS

| | | | |
|---|---|---|---|
| 5,299,667 A | 4/1994 | Hammond | |
| 5,339,928 A | 8/1994 | Deit et al. | |
| 5,520,265 A | 5/1996 | Kobayashi et al. | |
| 5,662,192 A | 9/1997 | Kingston et al. | |
| 5,697,472 A | 12/1997 | Walker et al. | |
| 5,712,805 A | 1/1998 | Wang et al. | |
| 5,730,268 A | 3/1998 | Villata | |
| 5,779,006 A | 7/1998 | Hyde et al. | |
| 5,825,287 A * | 10/1998 | Zarybnicky et al. | 340/453 |
| 5,908,097 A | 6/1999 | Grosspietsch et al. | |
| 5,927,458 A | 7/1999 | Weiss et al. | |
| 6,040,768 A | 3/2000 | Drexl | |
| 6,167,833 B1 | 1/2001 | Caraway et al. | |
| 6,206,158 B1 | 3/2001 | Muller et al. | |
| 6,250,429 B1 * | 6/2001 | Kramer | 188/1.11 L |
| 6,276,197 B1 | 8/2001 | Hayashi et al. | |
| 6,296,099 B1 | 10/2001 | Gochenour | |
| 6,341,670 B1 * | 1/2002 | Leblanc et al. | 188/1.11 L |
| 6,357,570 B1 | 3/2002 | Despres et al. | |
| 6,491,151 B1 | 12/2002 | Weidinger | |
| 6,564,909 B1 * | 5/2003 | Razzano | 188/1.11 L |
| 6,591,954 B2 | 7/2003 | Aker | |
| 6,659,233 B2 | 12/2003 | DeVlieg | |
| 6,755,294 B2 | 6/2004 | Ziegler et al. | |
| 6,920,968 B2 | 7/2005 | Sakai et al. | |
| 6,957,730 B1 | 10/2005 | Youngwerth | |
| 7,219,776 B2 * | 5/2007 | Bauer et al. | 188/218 XL |
| 7,424,936 B2 * | 9/2008 | McClellan | 188/1.11 W |
| 7,464,795 B2 * | 12/2008 | Hurwic | 188/1.11 E |
| 7,469,777 B2 | 12/2008 | Burkholder et al. | |
| 2002/0040838 A1 | 4/2002 | Hirschmann et al. | |
| 2003/0062237 A1 | 4/2003 | Ziegler et al. | |
| 2003/0106765 A1 | 6/2003 | Cole et al. | |
| 2004/0159522 A1 | 8/2004 | Conrad et al. | |
| 2006/0260881 A1 * | 11/2006 | Henley et al. | 188/1.11 W |

* cited by examiner

MATERIAL WEAR INDICATION SYSTEM

FIELD OF THE INVENTION

The present invention generally relates to friction plates, and more particularly, but not exclusively, to a method and system of detecting wear in friction plates.

BACKGROUND

Detecting when friction plates, such as brake pads and clutches, have become sufficiently worn remains an area of interest. Unfortunately, some existing systems have various shortcomings relative to certain applications. Accordingly, there remains a need for further contributions in this area of technology.

SUMMARY

One embodiment of the present invention is a unique friction plate and system. Other embodiments include apparatuses, systems, devices, hardware, methods, and combinations for detecting wear in friction plates. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
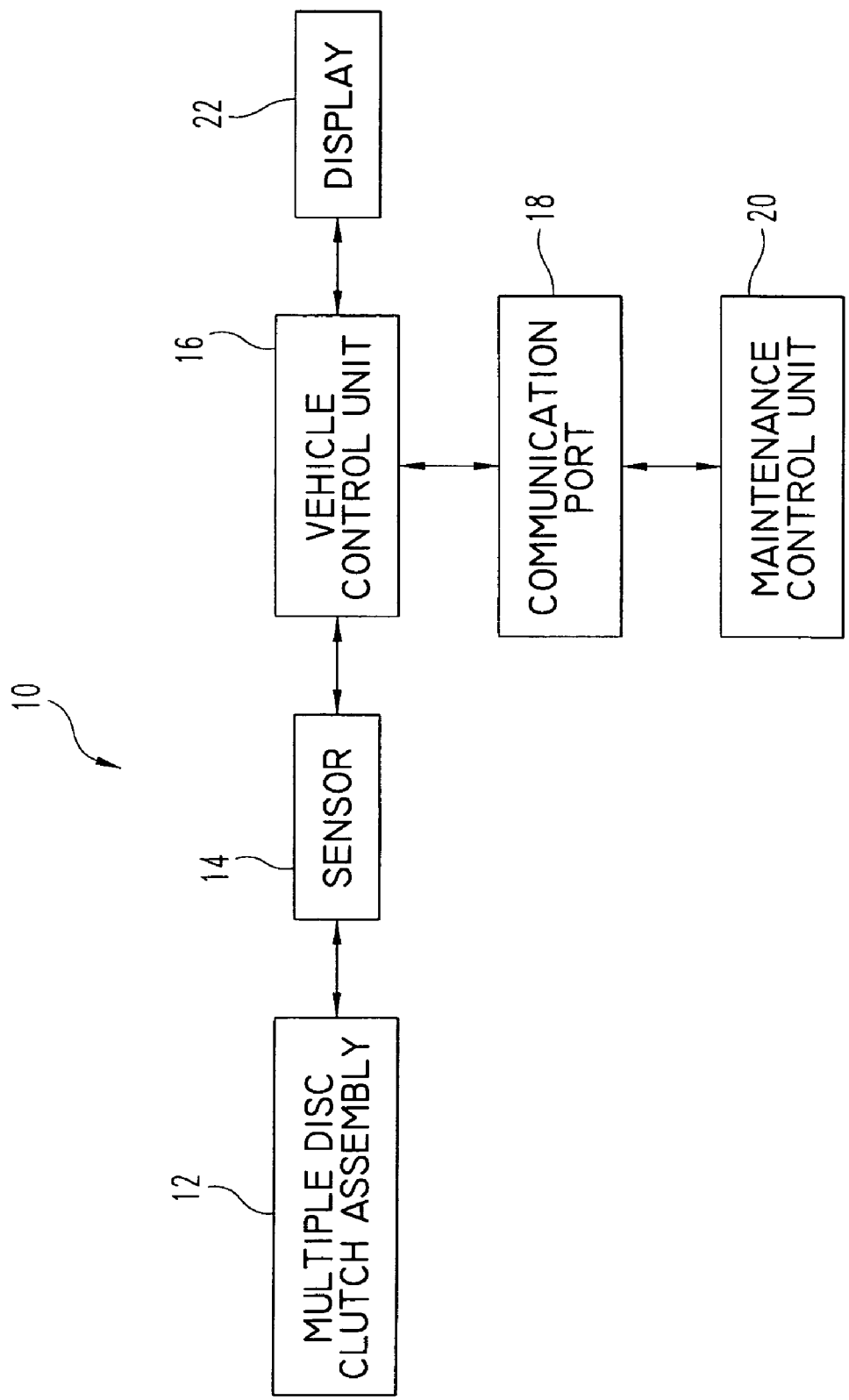
FIG. 1 is a block diagram of one embodiment of a material wear indication system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One aspect of the present application includes a friction plate, such as a clutch, operable to engage a moving surface and having a wearable portion and a non-wearable portion. A wear indicator is embedded in the non-wearable portion and is protected from the moving surface by the wearable portion of the friction plate. When, however, the wearable portion has sufficiently eroded, the wear indicator becomes exposed and releases a particulate matter. The particulate matter is detected by a sensor to indicate when the friction plate may be replaced or other maintenance is otherwise needed.

Figure 2:
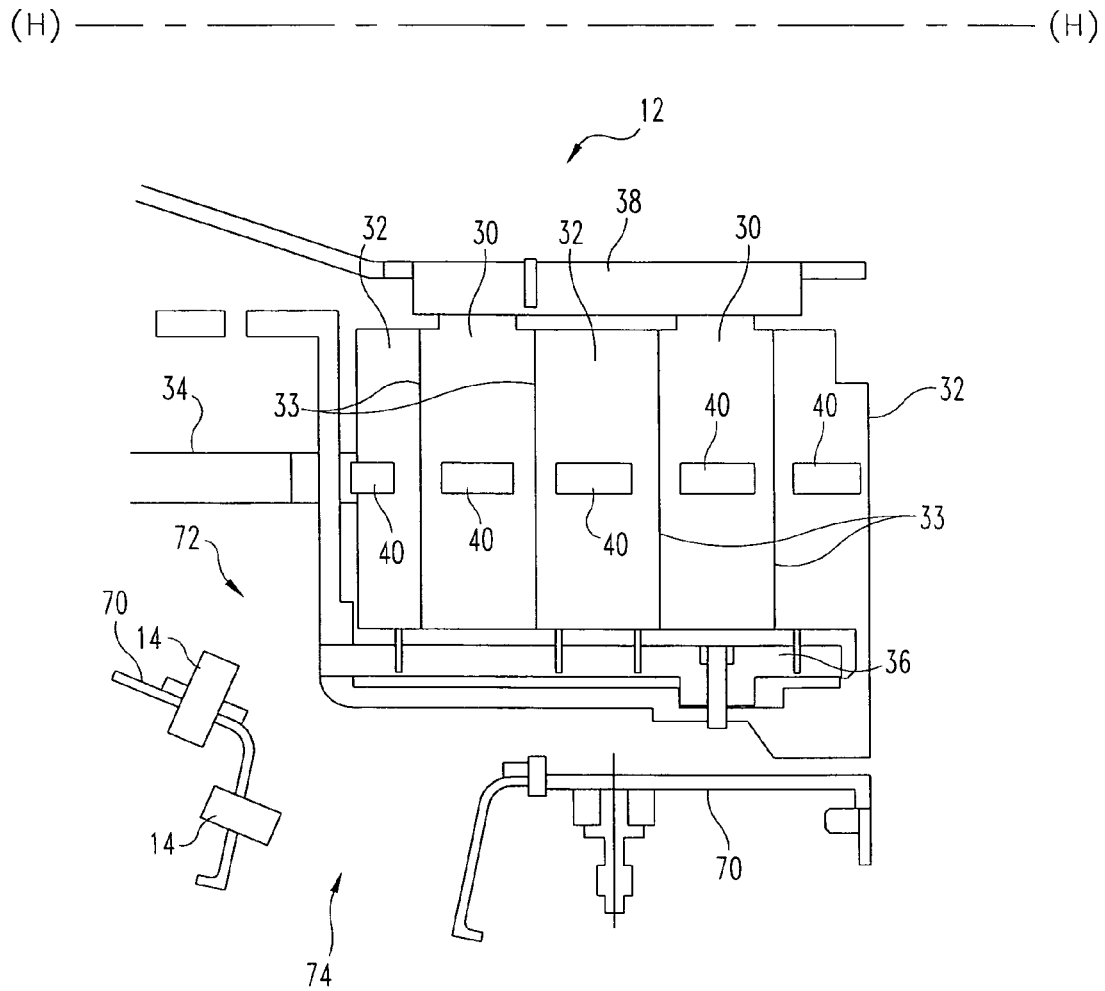
FIG. 2 is a partial cross-section of a portion of a multiple plate clutch assembly.

Referring to FIGS. 1 and 2, a material wear indication system 10 is disclosed that is operable to notify maintenance personnel when maintenance may be required on a multiple plate clutch assembly 12. The material wear indication system 10 includes at least one sensor 14 that is coupled with the multiple plate clutch assembly 12 and a vehicle control unit 16. The multiple plate clutch assembly 12 includes an input plate 30 and an output plate 32.

While the illustrative embodiment has been disclosed as a multiple plate clutch assembly 12, those skilled in the art should recognize that the present invention may be utilized in single clutch plate systems as well. Further, the present invention may be utilized in brake systems and any other type of system that utilizes friction plates or discs. In addition, while the preferred discs or plates are disclosed as two-sided friction plates, one-sided friction plates utilizing the present invention are also envisioned and incorporated herein.

Each of the input plates 30 and output plates 32 have a wearable surface 33 and may include at least one wear indicator 40. In some embodiments, however, less than all of the input plates 30 and/or output plates 32 may have a wear indicator 40. To set forth just one nonlimiting example, in some embodiments only the output plates 32 may include wear indicators 40, or perhaps every other output plate 32. Each of the input plates 30 and output plates 32 may have wearable surfaces 33 that are made of different substances or materials such that the amount of wear caused by relative movement may vary between the input plates 30 and output plates 32. In some embodiments it is also possible that a wearable surface 33 on one side of an input plate 30 may be made of a different material or substance than a wearable surface 33 disposed on the other side of the input plate 30. The same is true of different wearable surfaces of the output plates 32.

In one embodiment, the wear indicators 40 are shown disposed within the input plates 30 and output plates 32 and are configured to wear and/or erode when there is relative movement between mating surfaces of input plates 30 and output plates 32. The wear indicators 40 are exposed to a neighboring plate or to the ambient environment surrounding the plates when a sufficient amount of wearable surface 33 has been removed by relative movement between the plates. The wear indicators are configured to emit a particulate matter when exposed, either instantaneously or upon further relative movement of the input plates 30 and output plates 32. The particulate matter is different than any particulate matter emitted by the wearable surface 33.

The wear indicators 40 disposed within each of the plates 30, 32 may be configured to release particulate matter at varying levels of wear or erosion of the wearable surfaces 33. For example, a greater amount of wear and/or erosion of the input plates may be required, relative to the output plates 32, before the particulate matter is released from the wear indicators 40. In this way it may be possible to detect when the input plates have reached a particular erosion level. Likewise, some input plates 30 may require greater wear and/or erosion, relative to other input plates 30, before particulate matter is released from the wear indicators 40. In this way it may be possible to detect when a particular input plate has reached a particular erosion level.

Some wear indicators may be disposed in varying locations or numbers. Though the wear indicators 40 are shown disposed generally along a common line, some embodiments may have the wear indicators 40 distributed along another arrangement, or may be random. In some embodiments, the wear indicators 40 may be disposed at a periphery of the plates 30, 32. In addition, though each of plates 30, 32 are shown having a single wear indicator 40, some plates may have more than one wear indicator 40.

The multiple plate clutch assembly 12 includes a cover or housing 70 that encompasses or houses the components of the multiple plate clutch assembly 12. In this embodiment, the housing 70 defines a cavity 72 in which the components of the multiple plate clutch assembly 12 may be housed. A clutch exhaust aperture 74 is included in the housing 70 that allows the multiple plate clutch assembly 12 to vent particulates that are shed by the wear indicators 40. In some embodiments, however, the housing 70 may not include an exhaust aperture 74 such that any particulate matter released by the wear indicators 40 is contained within the housing 70. The speeds at which the plates 30, 32 rotate creates an airflow in the cavity 72 that directs the particulates that come off of the wearable surfaces 54, 56 and exit the cavity 72.

Sensors 14 are provided internal to the housing 70 and within the aperture 74 and are used to detect the particulate material released by the wear indicator 40. In some embodiments, the sensors 14 may be used to detect particulate matter emitted from the wearable surface 33. The sensors may reside solely within housing 70, solely in the aperture 74, or solely downstream of aperture 74 in other embodiments, depending upon the needs of any given application. Though the illustrated embodiment discloses multiple sensors, in some embodiments a single sensor may be appropriate.

The sensors 14 generate a signal upon detection of particulate matter, which signal is then transmitted to the vehicle control unit 16 discussed further hereinbelow. In some embodiments the sensors only transmit a signal upon request, either from a vehicle control unit 16 or other device. In other embodiments a light, alarm, or other type of device may be activated directly by the sensor as opposed to being routed through a vehicle control unit 16.

The sensors 14 may generate a signal upon detecting a sole particle of the particulate matter, or may generate a signal upon detecting a threshold number of particles. In some embodiments the strength, magnitude, frequency, or other characteristic of the signal may vary depending upon the number of particles, rate of detected particles, or concentration of particles. In other embodiments the sensor signal may merely be binary as a function of a single particle or multiple particles.

Different types of sensors 14 may be used depending on the application. The sensors 14 may be selected from a group of sensors consisting of a magnetic plug, a sensor operable to detect electromagnetic radiation, and/or a gas sensor, among others. In some embodiments, all sensors 14 may be of the same type. In other embodiments, however, different types of sensors may be simultaneously used in the material wear indication system 10. For example, in some embodiments, a gas sensor may be used in conjunction with a magnetic plug, or any other type of sensor.

In one embodiment, the wear indicators 40 may comprise a ferrous material/magnetically attractable material and the sensors 14 may comprise a magnetic plug. As the ferrous particulates are shed, they are picked up by the air flow and pass by the magnetic plugs, which capture the particulates due to the magnetic characteristics of the particulates. Once the sensor 14 senses that ferrous particulates have been captured, a signal is generated that is sent to the control unit 16 indicating that a respective plate 30, 32 has reached an erosion level that requires maintenance.

In another embodiment, the wear indicators 40 may comprise a colored material and the sensors 14 may comprise an optical sensor. As colored particulates are shed, they are detected by the optical sensor and, as previously set forth, the sensor 14 generates a signal that is sent to the control unit 14. The plates 30, 32 of the multiple plate clutch assembly 12 may have different colored materials embedded in the apertures 60 such that different colored particulates are shed to indicate a specific plate 30, 32 that requires maintenance.

In yet another embodiment, the wear indicator 40 may comprise a gaseous material and the sensors 14 may comprise a gas sensor. As gas particulates are released, they are detected by the gas sensor as they exit the clutch exhaust aperture 74. Different types of gas material may be used in each respective plate 30, 32 to indicate a specific plate 30, 32 that requires maintenance. As in the previous embodiments, detection of gas particulates causes the sensors 14 to generate a predetermined electric signal that is sent to the control unit 16.

The vehicle control unit 16 includes a communication port 18 that is operable to allow the vehicle control unit 16 to report the existence of a maintenance issue related to friction disc wear in the multiple plate clutch assembly 12. The communication port 18 may comprise a wireless communication port or a traditional connector-type communication port. The vehicle control unit 16 is connected with a maintenance control unit 20 via the communication port 18. This allows the vehicle control unit 16 to communicate the existence of maintenance issues to the maintenance control unit 20, which may reside on a vehicle or external to the vehicle. The vehicle control unit 16 is connected with a display device 22 that is operable to display a maintenance warning or message.

If the multiple plate clutch assembly 12 was installed in an aircraft, for example, a wear indication signal may be generated and sent to the vehicle control unit 16 when the sensor 14 detects particulate matter from one or more wear indicators 40. Once the vehicle control unit 16 is in communication range of the maintenance control unit 20, a plate maintenance indication may be transmitted to the maintenance control unit 20 to alert ground maintenance personnel of the issue. This may occur, for illustrative purposes only, when an aircraft that includes the multiple plate clutch assembly 12 lands and is checked by ground maintenance personnel or when the aircraft comes within range of the wireless communication port.

Various embodiments of the material wear indication system 10 disclosed herein are capable of notifying maintenance crews when one of the respective plates 30, 32 wears out or is worn out to a predefined level, without the need to periodically disassemble and visually inspect the system. It will be understood that the maintenance crews, or other personnel, can be notified whether or not a vehicle control unit 16 is provided. For example, a handheld device may be used to interface directly with sensor 14 to query whether one or more of plates 30, 32 have worn out. In this way sensor 14 may be configured to delay sending a signal representative of the particulate matter until requested.

As used herein, the term aircraft includes, but is not limited to, helicopters, airplanes, unmanned space vehicles, fixed wing vehicles, variable wing vehicles, rotary wing vehicles, hover crafts, vehicles, and others. Further, the present inventions are contemplated for utilization in other applications that may not be coupled with an aircraft such as, for example, industrial applications, power generation, pumping sets, naval propulsion and other applications known to one of ordinary skill in the art.

Referring more closely to FIG. 2, a partial cross-section of the multiple plate clutch assembly 12 is illustrated. The input plates 30 and output plates 32 are annular in shape and are mounted for rotation about a horizontal axis (H). The input plates 30 are connected with a clutch power transmission input shaft 38, and the output plates 32 are connected with a clutch power transmission output shaft 36. A clutch plate clamp shaft 34 is used to engage the input plates 30 to the output plates 32.

During one phase of operation of the multiple plate clutch assembly 12, the output plates 32 are relatively motionless while the input plates 30 are rotated about horizontal axis (H) through rotation of the clutch power transmission input shaft 38. As the clutch plate clamp shaft 34 is operated to bring the rotating input plates 30 into contact with the relatively motionless output plates 34, the wearable surfaces 33 of the plates wear and/or erode some amount while the output plates 32 respond to and are brought up to the same rotational speed as the input plates 30, thus causing identical rotational motion in the clutch power transmission output shaft 36. During this operation the load on the clutch power transmission input shaft 38 may increase thus causing a slowdown, which may be offset by the addition of power to the shaft.

Figure 3:
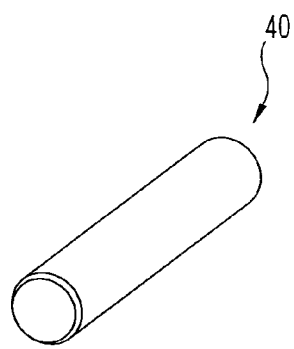
FIG. 3 depicts an illustrative wear indicator.

Referring to FIG. 3, one embodiment of the wear indicator 40 is shown having a cylindrical shape; however, other shapes and various sizes are contemplated. The wear indicator 40 may comprise any device or substance capable of emitting particulate matter, such as a ferrous material, a colored material, or a gas emitting material. As used herein the term colored denotes a wavelength in the electromagnetic spectrum, whether in the visible band or another, such as the infrared. For example, the wear indicator 40 may include a variety of materials that provide different heat signatures when released as particulates that can be detected by infrared sensors. In other embodiments, the wear indicator may include a liquid substance covered by a membrane such that when the membrane is breached the liquid is released. The liquid may be evaporated to create a gaseous particulate matter such as a gas molecule.

The various input plates 30 and output plates 32 may utilize different wear indicators 40. For example, in some embodiments the input plates 30 may collectively utilize one type of wear indicator 40 while the output plates 32 utilize another. In other embodiments, some input plates 30 may utilize different wear indicators 40 than other input plates 30. Varying the types of wear indicators 40 used in the multiple plate clutch assembly 12 may allow for precise detection of the wear of a particular plate. For example, if a first input plate 30 used a colored material and a second input plate used a gas emitting material, then it may be determined that the first input plate 30 needs to be replaced when colored material is detected by a sensor.

Figure 4:
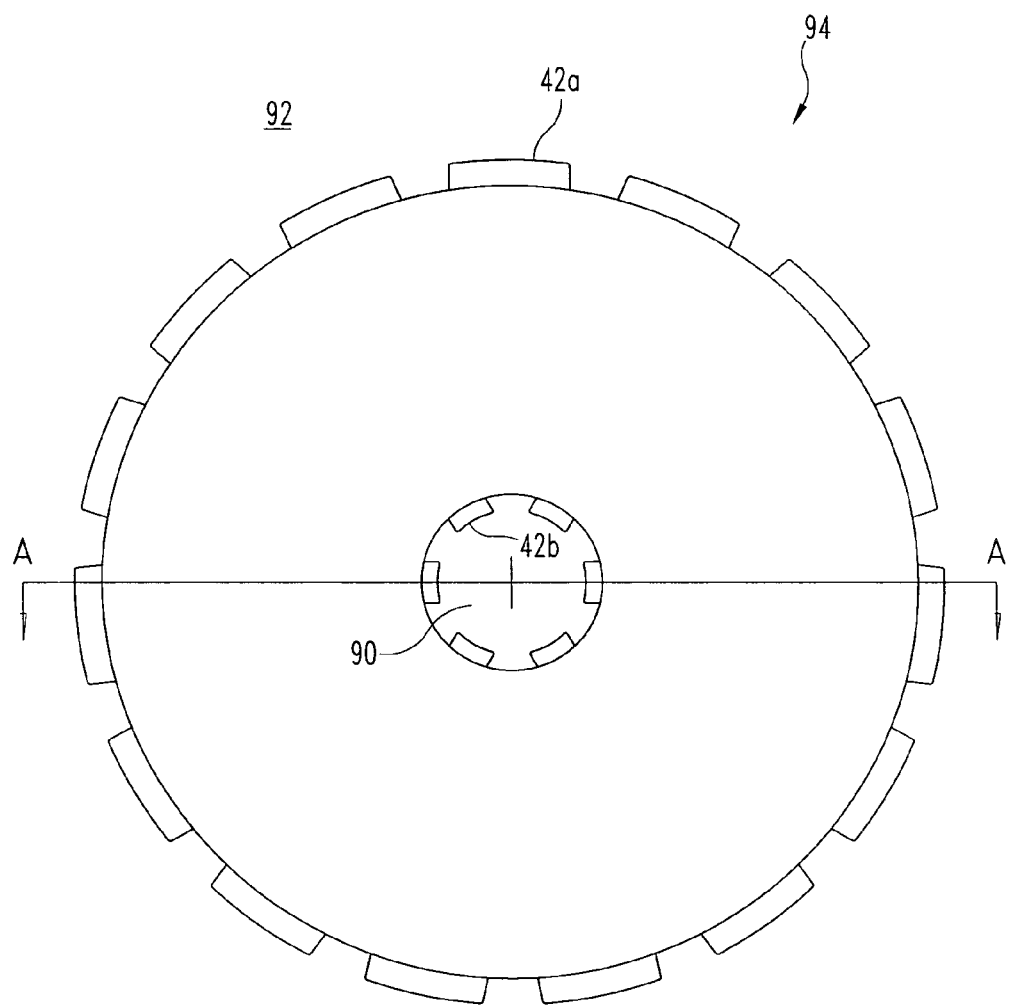
FIG. 4 is an end view of an illustrative friction plate.

Referring to FIG. 4, an end view of one embodiment of a friction plate assembly 94 is depicted. The friction plate assembly 94 is shown having a generally circular shape and includes a plurality of outside diameter lugs 42a and a plurality of inside diameter lugs 42b. The assembly 94 includes plates 30, 32 and may be manufactured in varying sizes to suit a particular application. The outside diameter lugs 42a are used to engage, in a male/female arrangement or fashion, similar lugs on the clutch power transmission output shaft 36. Similarly, the inside diameter lugs 42b are used to engage the clutch power transmission input shaft 38. The clutch power transmission input shaft 38 resides in interior 90 of the friction plate assembly 94, and the power transmission output shaft 36 resides in the exterior 92.

Figure 5:
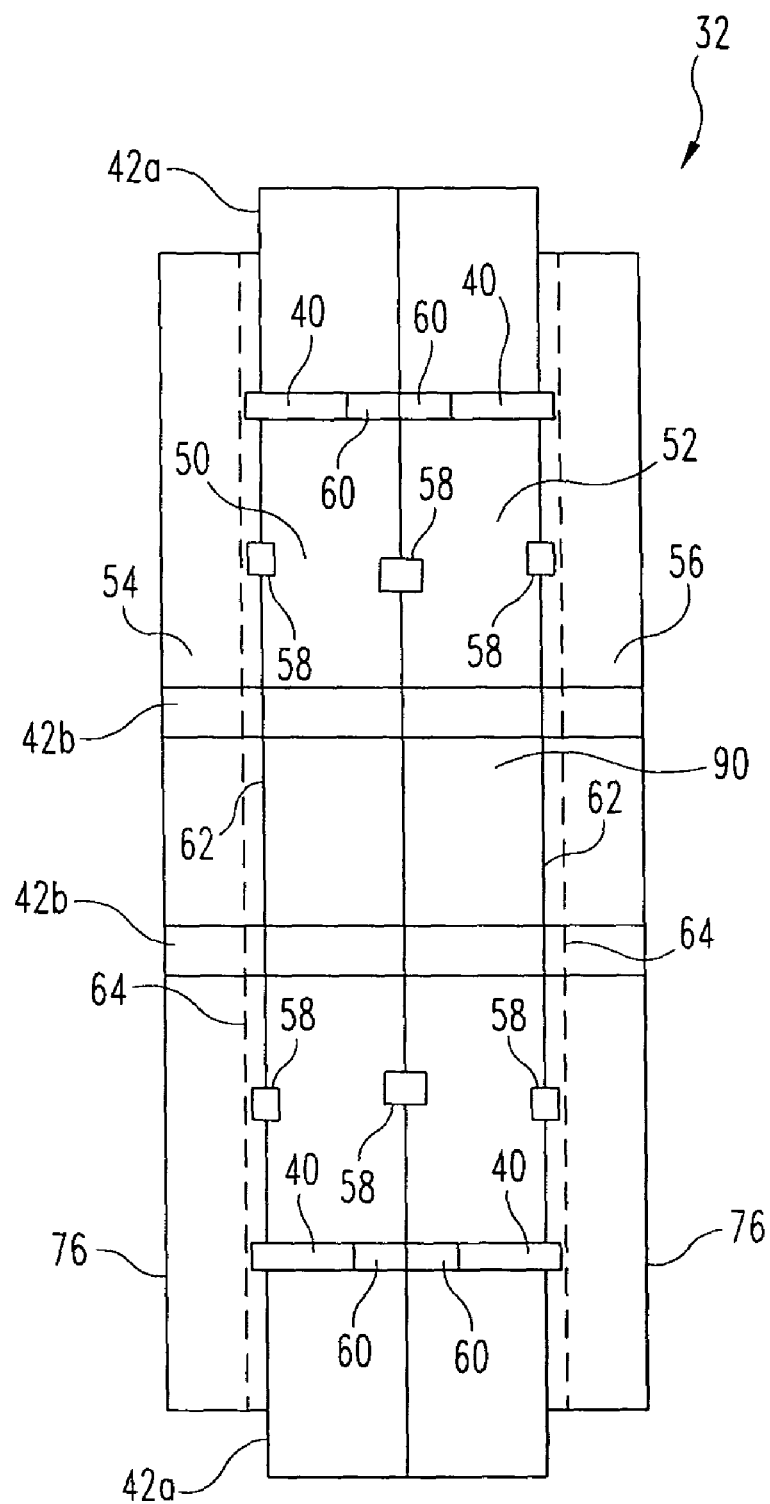
FIG. 5 is a cross-sectional view along line A-A in FIG. 4.

Referring to FIG. 5, a partial cross sectional view of a respective friction plate assembly 94 is illustrated along line A-A in FIG. 4. Shown in FIG. 5 is one embodiment of the single output plate 32 discussed above. The output plate 32 includes a first non-wearable surface 50, a second non-wearable surface 52, a first wearable surface 54, and a second wearable surface 56. The various surfaces 50, 52, 54, and 56 are connected together using a plurality of rivets 58, but various other types of connection mechanisms or devices may also be utilized in the present invention (e.g.—bolts, screws, and so forth). Additionally and/or alternatively, the various surfaces 50, 52, 54, and 56 may be bonded together.

The non-wearable surfaces 50, 52 may be manufactured from a metal alloy, steel, or any other material commonly known and used in the industry. The wearable surfaces 54, 56 may be manufactured from a carbon/carbon composite material or any other material commonly utilized in friction plate or brake technology. The wearable surfaces 54, 56 wear out after some amount of repeated frictional engagements with a surface that moves relative to the wearable surfaces, such as an input plate 30. As the input and output plates 30, 32 are repeatedly engaged, the wearable surfaces 54, 56 begin to erode or wear out, as commonly known in the art and as described hereinabove.

The non-wearable surfaces 50, 52 include a plurality of apertures 60 that may be spaced evenly, or randomly, around the non-wearable surfaces 50, 52. The apertures 60 may extend through the width of the non-wearable surfaces 50, 52. The wear indicators 40 are embedded in the apertures 60 of the non-wearable surfaces 50, 52 by way of a friction fit, gluing, epoxy, or any other similar manner of embedding objects in place. In some embodiments, however, the wear indicators 40 may be interwoven or otherwise integrally formed with the non-wearable surfaces 50, 52.

In one embodiment, the wear indicators 40 may be embedded in the wearable surfaces 54, 56 such that a portion of the wear indicators 40 protrude into the wearable surfaces 54, 56 a predetermined distance as illustrated in FIG. 5. In addition, similar to the non-wearable surfaces 50, 52, the wear indicator 40 may be interwoven or otherwise integrally formed with the wearable surfaces 54, 56. In one embodiment, the wear indicators 46 may lie adjacent to an outward edge 62 of the wearable surfaces 54, 56. In either embodiment, the wear indicators 40 are positioned such that they designate or indicate a particular erosion level, which is indicated by the dashed line 64 in FIG. 5. The particular erosion level 64 may be set based on a number of considerations. For example, the erosion level 64 may be set to provide sufficient margin in the remaining useful life of the input and output plates, to set forth just one nonlimiting example.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
a friction plate having a wear surface, and a wear indicator that emits the particulate matter to provide a wear indication when the wear surface of the friction plate has been eroded to an emission level; and
a sensor operable to detect the particulate matter.

2. The apparatus of claim 1, which further includes a wear indicator coupled with the friction plate and operable to emit the particulate matter when engaged with the moving surface.

3. The apparatus of claim 2, wherein the wear indicator is composed of a substance selected from the group consisting of ferrous material, colored material, and a gas emitting material.

4. The apparatus of claim 1, wherein the wear indicator is prevented from being exposed to the moving surface until a wearable portion of the friction plate has been removed.

5. The apparatus of claim 1, wherein the sensor is selected from a group consisting of a magnet, an optical sensor, and a gas sensor.

6. The apparatus of claim 1, which further includes a housing at least partially enclosing the friction plate and having an aperture through which at least some of the particulate matter passes.

7. The apparatus of claim 1, which further includes a control unit connected with the sensor and, wherein the sensor is operable to generate a signal that indicates the presence of particulate matter.

8. An apparatus comprising:
a friction plate;
a wear indicator coupled with the friction plate and emits a particulate matter to provide a wear indication; and
a control device configured to receive a wear indication signal based upon a presence of the particulate matter.

9. The apparatus of claim 8, wherein the friction plate includes a wearable portion and a non-wearable portion, the wear indicator oriented to emit a particulate matter when the wearable portion is worn to a predetermined level.

10. The apparatus of claim 9, wherein the wearable portion and non-wearable portion are connected together to form the friction plate.

11. The apparatus of claim 9, wherein at least a portion of the wear indicator extends into the non-wearable portion.

12. The apparatus of claim 8, wherein the wear indicator is composed of a substance selected from the group consisting of ferrous material and a colored material.

13. The apparatus of claim 8, which further includes an assembly of friction plates and wear indicators, wherein the wear indicators are coupled with the friction plates.

14. The apparatus of claim 8, which further includes a sensor operable to detect the emitted particulate material, the sensor in communication with the control device and provides the wear indication signal to the control device, the wear indication signal representative of the presence of the solid particulate matter.

15. An apparatus comprising:
a plurality of friction plates;
a wear indicator embedded in the plurality of friction plates and emits particulate matter; and
wherein the particulate matter provides a wear indication via a sensor operable to detect the particulate matter.

16. The apparatus of claim 15, wherein each of the plurality of friction plates includes a wear indicator.

17. The apparatus of claim 16, wherein each of the wear indicators emit different particulate matter.

18. A method, comprising:
engaging a wear surface with a friction surface of a friction plate device;
emitting a particulate matter as a result of the engaging; and
generating a wear signal due to the emission of particulate matter.

19. The method of claim 18 which further includes sensing the presence of the emitted particulate matter.

* * * * *